United States Patent [19]

Lankl

[11] Patent Number: 4,757,319
[45] Date of Patent: Jul. 12, 1988

[54] ADAPTIVE DEPOLARIZATION-INTERFERENCE-COMPENSATOR

[75] Inventor: Berthold Lankl, Munich, Fed. Rep. of Germany

[73] Assignee: Siemens Aktiengesellschaft, Berlin and Munich, Fed. Rep. of Germany

[21] Appl. No.: 45,476

[22] Filed: May 4, 1987

[30] Foreign Application Priority Data

May 6, 1986 [DE] Fed. Rep. of Germany ....... 3615314

[51] Int. Cl.$^4$ .......................... G01S 3/16; H01Q 21/06; H04B 1/10
[52] U.S. Cl. .................................. 342/378; 342/383; 342/361; 375/102
[58] Field of Search ............... 342/361, 194, 362, 363, 342/364, 365, 366, 92, 378, 382, 380, 383; 375/102

[56] References Cited

U.S. PATENT DOCUMENTS

| | | | |
|---|---|---|---|
| 3,155,965 | 11/1964 | Harmer | 342/378 |
| 3,735,266 | 5/1973 | Amitay . | |
| 4,053,882 | 10/1977 | Van Etten | 342/361 |
| 4,090,137 | 5/1978 | Soma et al. | 342/361 |
| 4,283,795 | 8/1981 | Steinberger | 342/361 |
| 4,293,945 | 10/1981 | Atia et al. | 342/361 |
| 4,310,813 | 1/1982 | Yuuki et al. | 342/361 |
| 4,438,530 | 3/1984 | Steinberger | 342/361 |
| 4,466,132 | 8/1984 | Namiki | 342/362 |
| 4,479,258 | 10/1984 | Namiki | 342/361 |
| 4,561,067 | 12/1985 | McKeown | 342/378 |
| 4,575,862 | 3/1986 | Tahara et al. | 375/102 |
| 4,577,330 | 3/1986 | Kavehrad | 375/102 |
| 4,606,054 | 8/1986 | Amitay et al. | 342/362 |
| 4,631,734 | 12/1986 | Foschini | 375/102 |
| 4,660,045 | 4/1987 | Clark | 342/361 |

OTHER PUBLICATIONS

ICC'84 Links for the Future, May 14–17, 1984, IEEE International Conference on Communications Proceedings, vol. 3, pp. 1442–1446.
IEEE Adaptive Receiver for Cross-Polarized Digital Transmission by Namiki and Takahara, pp. 46.3.1–46.3.5.
1979 IEEE, A Decision–Directed Network for Dual-Polarization Crosstalk Cancellation by William J. Weber, III, pp. 40.4.1–40.4.7.

Primary Examiner—Theodore M. Blum
Assistant Examiner—David Cain
Attorney, Agent, or Firm—Hill, Van Santen, Steadman & Simpson

[57] ABSTRACT

An adaptive depolarization-interference-compensator for a digital radio relay system using multi-level quadrature amplitude modulation (QAM) with co-channel operation of the orthogonally polarized signals which is not necessarily synchronous with the clock frequency and/or carrier frequency and produces good compensation of depolarization effects.

The receiving branch of the two receivers (3, 4), which use the same RF-local oscillator (5) or separate RF-local oscillators are synchronized for the differently polarized signals and each contain a quadrature demodulator (8, 14) for two signal components (I- and Q-channel). A canceller is provided which consists of two quadrature demodulators (20, 23) for the two polarization directions, which are each supplied at with an IF-received signal of one polarization and the IF-carrier (9, 15) of the respective other polarization, and which consist of complex transversal filters (21, 22, 24, 25) (I- and Q-channel) in the signal paths to the two quadrature demodulators (20, 23). The transversal filters (21, 22, 24, 25) have their outputs coupled into the receiving branch of the respective other polarization. The delay time $\tau_0$ between the tappings of the transversal filters corresponds at the maximum to half the reciprocal value of the frequency of the highest spectral component of the base-band signal with a rational ratio m/n which preferably supplies a delay time which is shorter than or equal to $\tau_0$ (m/n = ratio of the symbol period of the interference signal to the transit time between the tappings of the transversal filter; m, n whole numbers).

6 Claims, 7 Drawing Sheets

ADAPTIVE DEPOLARIZATION-INTERFERENCE-COMPENSATOR

BACKGROUND OF THE INVENTION

1. Field of the Invention

This invention relates in general to an adaptive depolarization-interference-compensator for digital radio relay systems utilizing multi-stage quadrature amplitude modulation (QAM) with common channel (Co-channel) operation of the orthogonally polarized signals which is not necessaily synchronous with the clock frequency and/or carrier frequency and uses transversal filters with devices for coupling signals out of the receiving branch of one polarization and to the input couple signals into the receiving branch of the other polarization.

So as to increase the bandwidth efficiency in digital radio relay links featuring multi-stage quadrature amplitude modulation (16QAM, 64QAM, ...) the possibility exists of using both polarization directions simultaneously in a channel.

2. Description of the Prior Art

The previous practice of using both polarization directions (vertical and horizontal) is limited to the orthogonally polarized transmission of adjacent channels so that by polarization decoupling to reduce the adjacent channel interference to an extent such that at least a partial overlap of neighboring spectra is possible. The use of both orthogonal polarization directions and common channel operation increases the bandwidth efficiency approximately by a factor of 2. However, the susceptibility to interference due to depolarization effects is substantially greater. Depolarization occurs, for example, during rain, snow and in the case of multi-path propagation. In the case of multi-path propagation, due to the antenna characteristics for the two polarization directions especially with deep dispersive fading, frequency selective depolarization occurs. The main effects of the depolarization are dependent upon propagation conditions which are naturally time variable.

For compensation of these depolarization effects, so-called cancellers have been provided which consist of adaptive phase shifters arranged crosswise with an automatic gain control AGC between the two receiving channels. This serves to reduce the coupling of the two channels caused by depolarization. Such arrangement can be constructed in the RF range, the IF range or in base-band. The effectiveness in the case of frequency selective depolarization is only limited, however. An article entitled "A Decision Directed Network For Dual Depolarization Cross-Talk Cancellation" by William J. Weber, published in ICC 79 Pages 40.4 to 40.4.7 describes an arrangement of this kind.

An arrangement of this kind is also disclosed in U.S. Pat. No. 3,735,266 which describes a method and arrangement for reducing the cross-talk in microwave transmission systems in which the information is transmitted in two polarizations or channels. In this system, a pilot signal is additionally transmitted in each channel and the components of which are detected in corresponding receiver devices. Signals are thus derived so as to eliminate cross-talk.

For improved compensation of the frequency selective depolarization, transversal filters are used as cancellers either in the IF plane or in the base-band. These consist of so-called Baud-spaced transversal filters, in other words, the delay time between two consecutive tappings is equal to one symbol period. However, such cancellers are not particularly suitable when the clock signals of the data flows of the two polarization directions are not synchronous.

The setting of the transversal filters is fundamentally accomplished using two algorithms, one being the zero forcing algorithm and the other the minimum-mean-square-error algorithm (MMSE). Both algorithms operate using samples of the multi-level base-band signals. It is thus clear that the setting of the filters is dependent upon the clock phase. So as to adjust the canceller, it is necessary to use the clock rate of the interference signal so as to achieve a stable setting of the coefficients. The zero forcing algorithm causes a precise identify between the compensation signal and the interference signal at a number of sampling instants which correspond to the filter length (number of coefficients). The MMSE algorithm results in a minimum mean square error between the compensation signal and the interference signal at all sampling times. In the case of asynchronous clock signals, however, the sampling time of the interference signal generally does not conform with the sampling time of the desired signal. Thus, in case of a Baud-spaced transversal filter, the sample values in the symbol clock spacing do not satisfy the sampling theorem using a realizable Nyquist pulse shaping. Thus, conformity between the compensation signal and the interference signal is not very good outside of the sampling times used for the acquisition of the coefficient setting. See, for example, FIGS. 8A and 8B which for a simple base-band model with selective depolarization interference represents the interference signal and the compensation signal in FIG. 8A and represents the residual interference for a canceller composed of a 7Tap-Baud-spaced transversal filter in FIG. 8B. In this system, the canceller is set according to the zero forcing algorithm as can be seen from the zero positions of the residual interference according to the filter length. Between the sampling times, the residual interference is relatively great.

SUMMARY OF THE INVENTION

It is an objective of the invention to provide an adaptive depolarization interference compensator which even in the case of asynchronous co-channel operation- in other words, thus, also between the sampling times of the differently polarized signals, good compensation of the depolarization effects is achieved. The aim of the invention is fulfilled in that in a compensator of the type described above, the receiving branches of the two receivers use a common RF local oscillator or separate RF oscillators synchronized to each other for the differently polarized signals and each case contains a quadrature demodulator for two signal components (I- and Q-channels) and wherein a canceller is also provided which consists of two quadrature demodulators for the two polarization directions each of which is supplied at its input with an IF received signal of the one polarization and the IF carrier of the respective other polarization and which further consists of a complex transversal filter (I- and Q-channels) in the signal path to the quadrature demodulators and which transversal filters are connected into the receiving branches of the respective other polarization and have delay times $\tau_0$ between their taps which correspond at the maximum to one-half the reciprocal value of the frequency of the highest spectral component of the base band signal which fulfills the sampling thereom with a rational ratio m/n which preferably supplies a delay time which is smaller than or equal to $\tau_0$ where n, m are whole numbers.

Other objective, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIGS. 5a through 5i are graphic representations for explaining the acquisition of the error signal;

DESCRIPTION OF THE PREFERRED EMBODIMENTS

Figure 1:
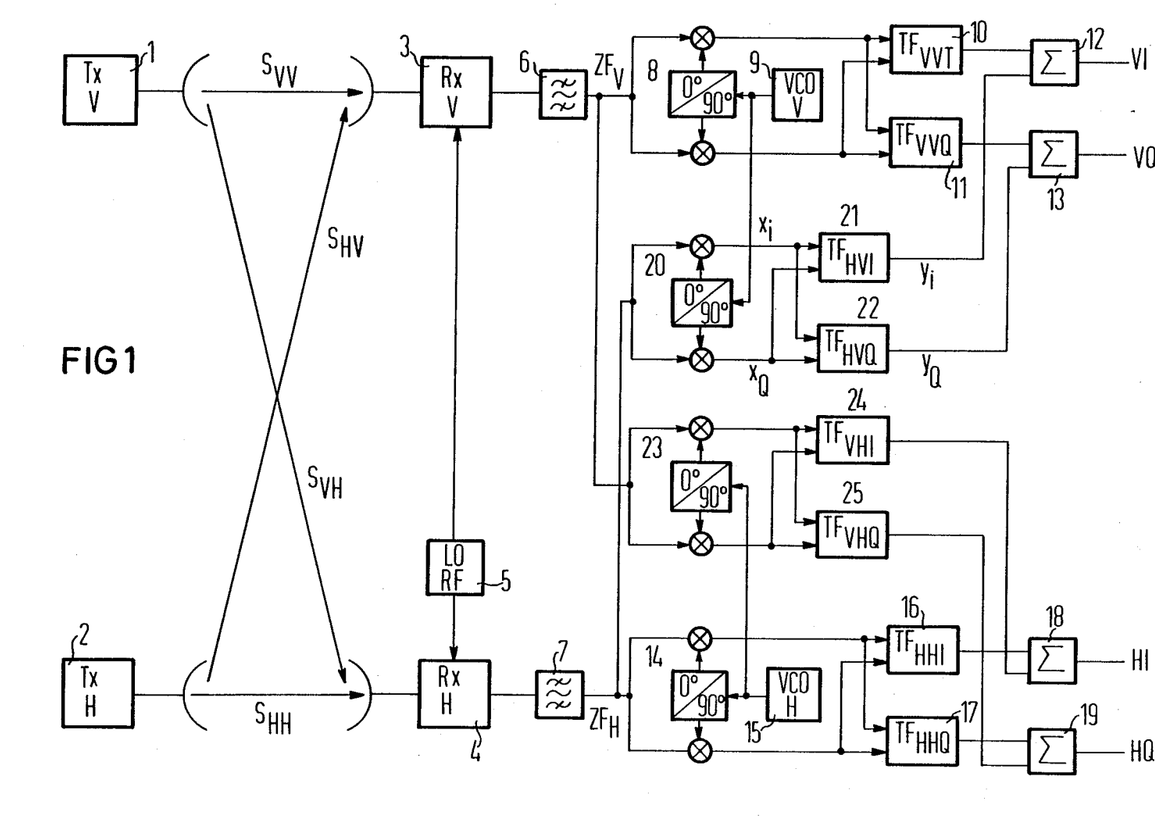
FIG. 1 is a block diagram of an adaptive compensator without a correlation component.

FIG. 1 illustrates a radio relay system with an adaptive compensator in a simplified version. At the transmitting side where it will be assumed that the carriers are not synchronized two transmitters 1 and 2 (transceivers Tx) transmit the vertical polarization and the horizontal polarization by way of the antennas illustrated. The receiving antennas illustrated are respectively connected to receivers (receivers Rx) 3 and 4 for the vertical and horizontal polarization. It is to be realized that although the vertical receiving receiver 3 is intended to receive the vertical polarized signal that there is a certain amount of undesirable horizontal $S_{Hv}$ signal which arrives at the receiver 3. Likewise, a certain amount of the vertical polarized signal $S_{VH}$ arrives at the horizontal receiver RxH4. A common local oscillator 5 supplies inputs to the receivers 3 and 4, or, alternatively, separate RF local oscillators for the receivers 3 and 4 can supply signals to the receivers, but in this case the local oscillators must be synchronized. As shown due to depolarization effects in the radio field interference components of one polarization horizontal or vertical, enter the received signal for the other polarization as illustrated. This is indicated in FIG. 1 by the intersecting arrows $S_{HV}$ and $S_{VH}$ so that signal components of the horizontal polarization enter the receiving path of the vertical polarization receiver and signals of the vertical polarization enter the receiving path of the horizontal polarization receiver.

Receiving filters 6 and 7 are respectively connected to the outputs of the receivers 3 and 4. A first quadrature demodulator 8 is connected to the output of the filter 6 and a second quadrature demodulator 14 is connected to the output of the filter 7. Local oscillator 9VCOV supplies an input to a 0 and 90° phase shifter in the demodulator 8 which supplies outputs to mixers which receive the signal $ZF_V$ from the filter 6. The output of the mixers are each supplied to baseband transversal filters 10 and 11 as illustrated. The demodulator 14 has a local oscillator 15VCOH which supplies an input to the 0/90° phase shifter which supplies outputs to a pair of mixers which receive the output of the filter 7 which is $ZF_H$. A pair of baseband transversal filters 16 and 17 each receive outputs of the two mixers as shown. Located between the two quadrature demodulators 8 and 14 between the two receiving branches and the baseband transversal filters 10 and 11 and 16 and 17 is the actual canceller which consists of two quadrature demodulators 20 and 23 which are provided for the two polarization directions. The quadrature demodulator 20 receives the output $ZF_H$ from the filter 7 which is supplied to two mixers that receive inputs through the 0 and 90° phase shifter from the oscillator 9 and the output of the mixers are both supplied to complex transversal filters 21 and 22. The output of the filters 21 and 22 are supplied to adders 12 and 13 which also receive outputs from the filters 10 and 11 and the output of the adder 12 is VI and the output of the adder 13 is VQ. A quadrature demodulator 23 has a pair of mixers which receive inputs from the filter 6 and also receives inputs from a phase shifter 0/90° which receives an input from the oscillator 15. Transversal filters 24 and 25 each receive inputs from the mixers and respectively supply outputs to adders 18 and 19 which also receive inputs from the filters 16 and 17. The output of the adder 18 is HI and the output of the adder 19 is HQ. The adders 12, 13, 18 and 19 could also be mounted directly following the quadrature demodulators 8, 14 with a preceding delay time compensator so as to compensate for the signal delay time between the transversal filter of the canceller. The delay time between the tappings of the transversal filters 21, 22 and 24 and 25 corresponds at the maximum to one-half the reciprocal value of the frequency of the highest spectral component of the baseband signal so as to fulfill the sampling theorem. It is advantageous to select a rational ratio of m/n which supplies a shorter or equal delay time. Here m and n are whole numbers. In the exemplary embodiments, the value m/n equals 2 has been selected. Additional details relating to the setting of the transversal filters 21, 22 and 24 and 25 which provide for compensation are given below.

Figure 2:
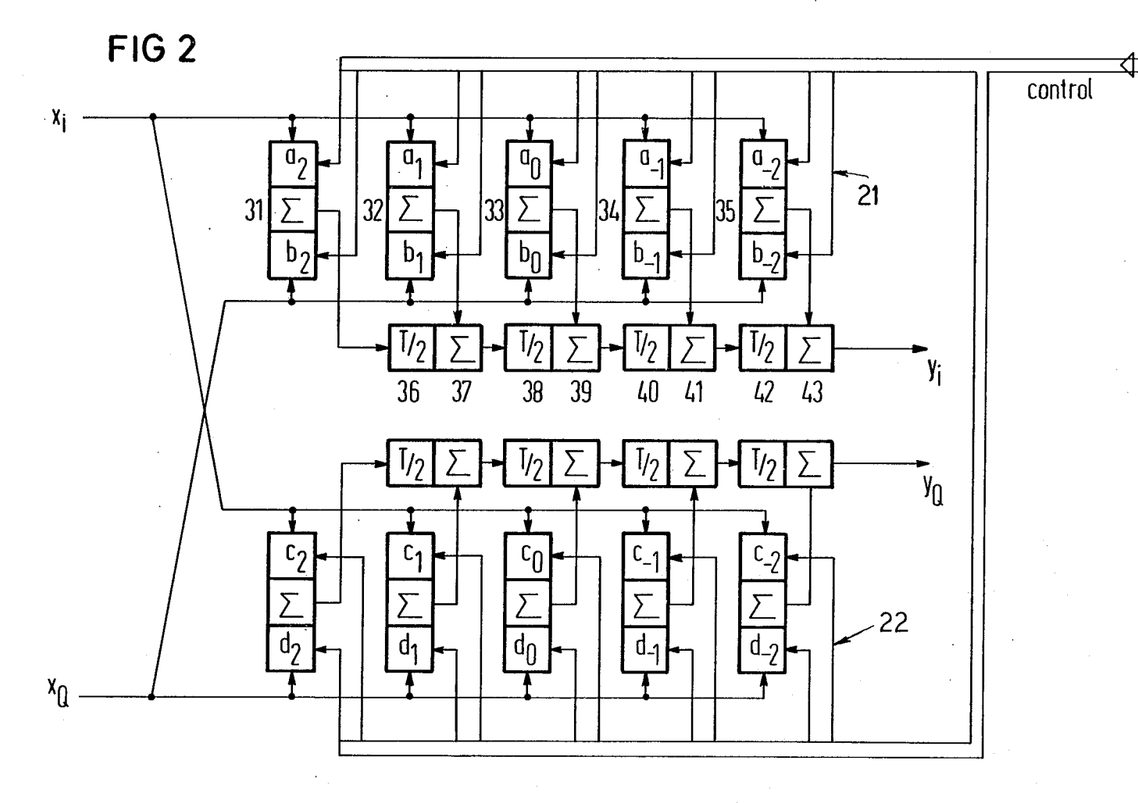
FIG. 2 is a block circuit diagram of a complex T/2 transversal filter.

FIG. 2 illustrates a structure of a pair of complex T/2 transversal filters which has been represented in the form of a symmetrical 5Tap transversal filter with parallel-in-serial-out structure. This transversal filter receives the inputs $x_I$ and $x_Q$ and produces the outputs $y_I$ and $y_Q$ and comprises a detailed view of the transversal filters 21 and 22 illustrated in FIG. 1 and it is to be noted that the filters 21 and 22 in FIG. 1 receive the same inputs and produce the same outputs as illustrated in FIG. 2. A complex arrangement of this kind including an I and Q channel and provided for a QAM system contains identical equalizers in both channels. Since compensation of cross-talk from one channel to the other is to be accomplished, each channel contains two coefficients, a and b in one channel, and c and d in the other channel and these are the same order and the coefficient inserting units (multipliers) a and b are connected together by adders and the coefficient units c and d are connected together by adders. The portion of the circuit which relates to the generation for the setting values which are the coefficients for the setting elements is illustrated in FIGS. 4 and 5 and will be explained in detail later herein. This is merely indicated by the arrows on the right-hand side of FIG. 2 which indicates that the setting elements are supplied with adjusting voltages from a correlator. The equalizers in the I and Q channels have an identical design so the construction of one equalizer is sufficient to explain the circuit. Thus, in the I=channel, the setting elements $a_2 \ldots a_{-2}$ and $b_2 \ldots b_{-2}$ each with the associated respective adders 31 ... 35 are arranged in parallel to each other at the input and the outputs are supplied to a series arrangement comprising the delay element 36, 38, 40 and 42 and adders 37, 39, 41 and 43 connected as indicated in FIG. 2. Thus, the output of the adder 31 is supplied to the time delay 36 and the output of the adder 32 is supplied to the adder 37 and the output of the adder 33 is supplied to the adder 39 and the output of the adder 34 is supplied to the adder 41 and the output of the adder 35 is supplied to the adder 43.

Figure 3:
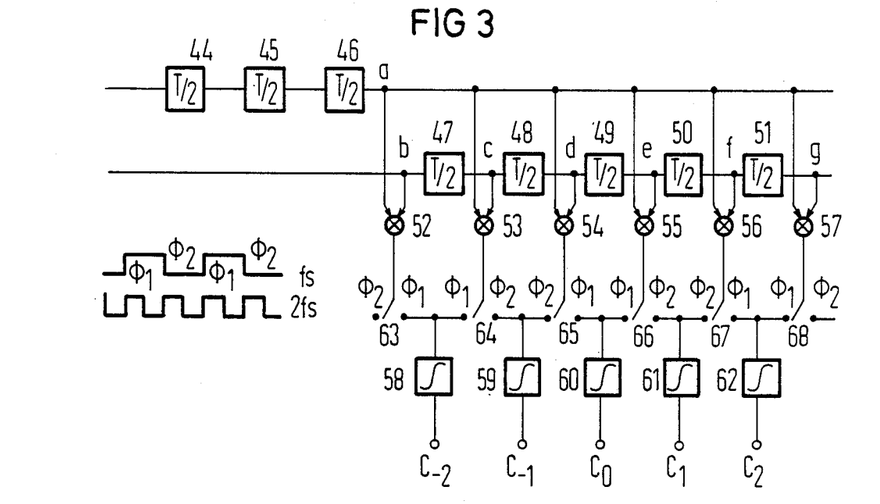
FIG. 3 is a block circuit diagram of a correlator for a 5Tap-T/2 transversal filter in partial view.
Figure 6:
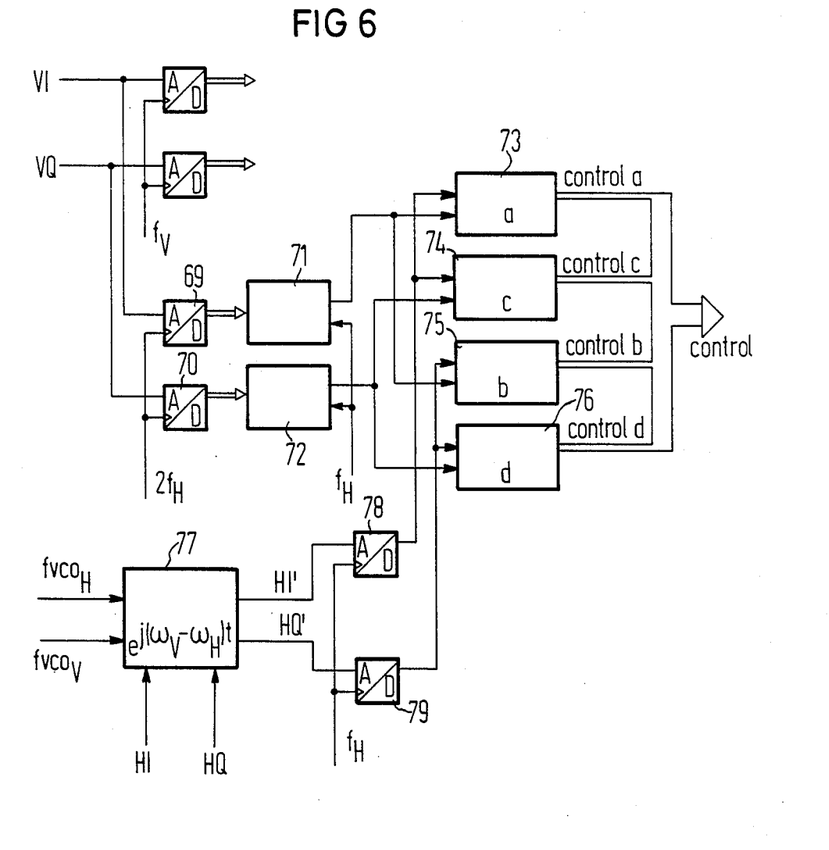
FIG. 6 is a diagram of a device for deriving the main signal and error signal with connected correlators.

The adaptive setting of the transversal filters is accomplished using a specially designed correlator of which FIG. 3 provides a partial view, in other words, one-fourth of the overall arrangement for a B5-Tap-transversal filter. An error signal and a main signal are required for the correlation and the error signal is obtained by sampling the disturbed received signal at a frequency corresponding to the reciprocal value of the delay time of a delay element in the transversal filter of the canceller, and the main signal is the signal which represents the disturbed transmitted sequence and which is obtained from the received signal of the other polarization. (FIG. 6 is a circuit for acquisition of these signals). The error signals and the main signal are supplied through delay elements 44 through 51 which have a delay corresponding to that in the transversal filter and, thus, in the exemplary embodiment of T/2 in a time staggered fashion to a chain of correlators comprising multipliers 52 ... through 57 and integrators 58 ... through 62 whereby the signal path of the error signal are the multiplied results as illustrated in FIG. 3 contains a switch-over device 63 ... 68 with a general ratio of m/n of the sampling frequency for the acquisition of the error signal at the clock rate of the interference signal. As a result of the switch-over, the error sample values or multiplication results which differ during the time n times symbol period of the interference signal (m times the sampling clock period of the error signal) are switched to the corresponding integrators. The output signals from the integrators 58 ... 62 produce the coefficient setting signals as illustrated. With the delay time of T/2 which has been selected in the exemplary embodiment, the change-over switches 63 ... 68 are switched over at the timing of one-half the symbol period. Thus with double the clock frequency at $2f_S$ so that they are connected to adjacent integrators 58 ... 62 during clock phases of equal lengths $\phi_1$ and $\phi_2$.

Figure 4A:
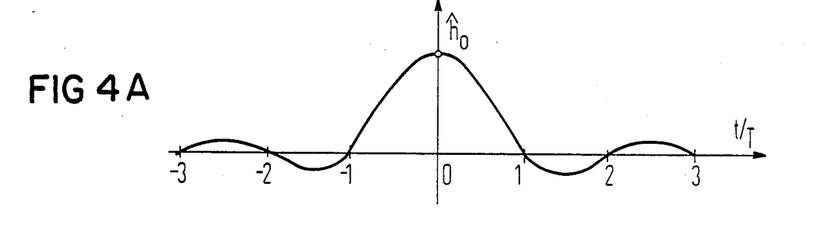
FIGS. 4A and 4B are graphic representations for the curve of the main signal and the error signal with associated clock phases.
Figure 4B:
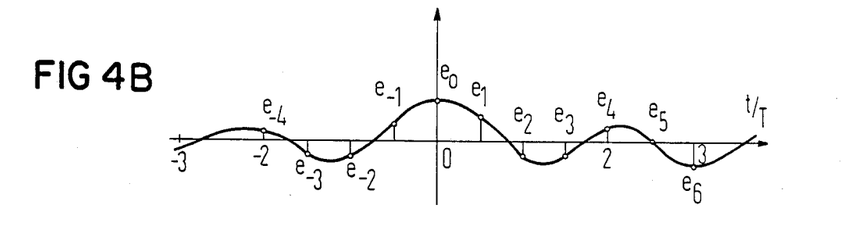
Figure 5:
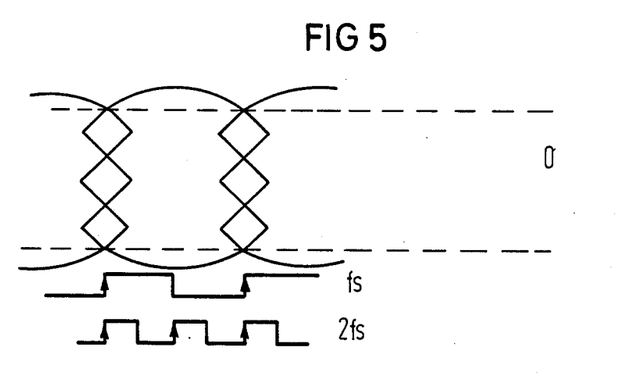
FIG. 5 is a time plot of fs and 2fs.

The mode of operation of this described circuit is graphically illustrated in FIGS. 4A and 4B in which for simplicity the principal of the correlator has been applied only to one channel. FIG. 4A represents the curve of the main signal which at the time t=0 has a maximum value of $h_0$ and in a symmetrical curve has zero transitions at $-3T$, $-2T$, $-1T$, $+1T$ and $+2T$, $+3T$. FIG. 4B illustrates an error signal with the sample values of $e-6, e-5, e-4 \ldots e_0 \ldots e_4, e_5, e_6$ at the times $-3T$ to $+3T$. The transmitted sequence of the main signal is supplied at the speed of the symbol clock rates $f_S$ to correlator and the error samples are supplied at double the symbol clock rate $2f_S$.

Figure 5A:
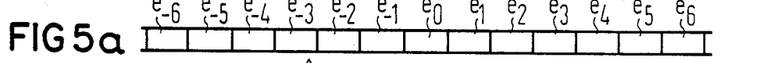
Figure 5B:
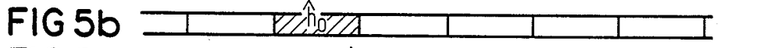
Figure 5C:
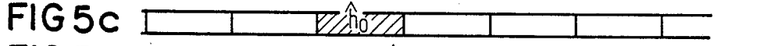
Figure 5D:
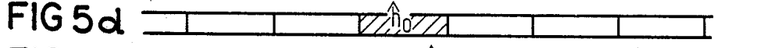
Figure 5E:
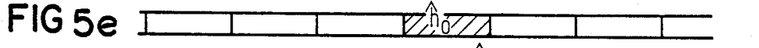
Figure 5F:
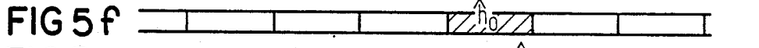
Figure 5G:
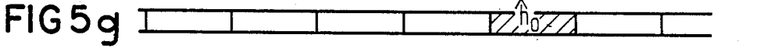
Figure 5H:
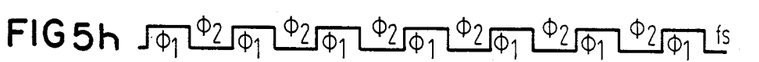
Figure 5I:
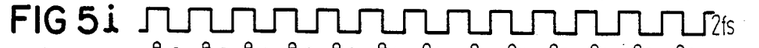

This is illustrated graphically in FIGS. 5a and 5i. FIG. 5h illustrates the clock rate $f_s$ and FIG. 5i illustrates double the clock rate $2f_s$. FIGS. 5a through 5g illustrate the signals existing at various points in FIG. 3 wherein the individual letters a through g correspond respectively to FIG. 3 (letters by the tappings of the correlator). The time diagrams of the correlator indicate that during a symbol period two error sample values reach the same multiplier 52 ... 57 and these carry out the filters setting for two adjacent coefficients of the T/2 transversal filter. Thus, this means that the results of the multiplier must be switched to the corresponding inputs of the integrators 58 ... 62 at double the symbol clock rate.

Figure 7:
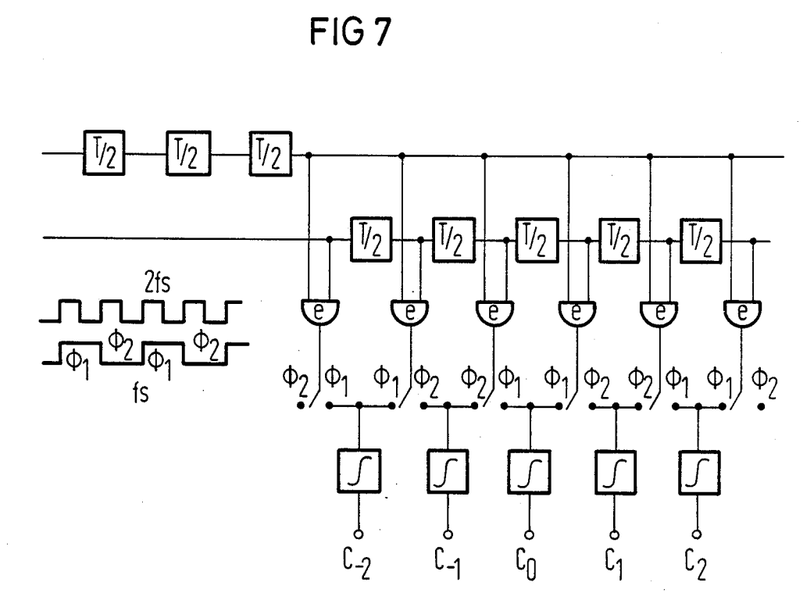
FIG. 7 is a diagram of a further embodiment of a correlator for a 5Tap-T/2 transversal filter.

At the high data rates normally occurring in practice, as simple as possible a correlator is used. Only the sign of the main signal (1 bit) and the sign of the error signal (1 bit) are used so that the multiplier can be simplified to an EX-OR-gate (exclusive-OR-gate) (MOD 2 multiplication). A correlator of this kind with an EX-OR-gate as a multiplier is illustrated in FIG. 7 in which for simplicity only one quarter of the overall arrangement has been shown as in the case of the corresponding correlator arrangement in FIG. 3. The remaining portion of the two correlators are identical and therefore the detailed description of the FIG. 7 can be understood and the gates e (EX-OR-gates) replace the multipliers 52 ... 57 in FIG. 3. Otherwise, the circuit of FIG. 7 is the same as that illustrated in FIG. 3.

The error signal can be derived as represented in FIGS. 4a through 4g in the example of a 16QAM signal. For determining the error signal, two thresholds are formed which are set at the two highest signal levels, in other words, the greatest and most positive and negative amplitude levels. The following applies: if the sampled signal is greater than the upper threshold, the contribution of the error is positive; if the sample value is smaller than the most negative stage, the contribution of the error is negative. If, however, the sample value lies between these two values, the contribution of the error is zero which results in no correlation information. In contrast to one single level in the center, this derivation of the sample values has the advantage that in the case of synchronous data flow, one sampling of the error bit which coincides with its eye center point of the disturbed desired signal supplies correlation information even in the case of minor interferences.

However, the main signal which produces the depolarization interference is also important for the correlation. This signal already exists, but it has been demodulated in respect to the error sample values with another carrier. Therefore, for the correlation the signal which produces the depolarization interference is multiplied by the complex phasor of the difference indicator of the carrier frequencies of the two polarizations. The main signal required for the correlation can then be obtained by sampling. A circuit which provides the error signal and carries out the above-mentioned multiplication of the main signal and, thus, generates the input signals for the correlator control is illustrated on one side of the canceller shown in FIG. 6. This circuit serves to eliminate interference of the H channel in the V channel. For this purpose, signal components are output coupled from the I and Q channels of the vertically polarized signal and are each supplied through A/D converter 69, 70 to error signal analyzers 71/72 which have outputs which are each connected to two correlators 73, 75 and 74, 76, respectively, which may be of the types described in FIGS. 3 and 7. In addition, signal components of the I and Q channels of the horizontally polarized signal are supplied to a multiplier 77 in which they are multiplied by the complex phasor of the difference of the carrier frequencies $f_{VCOH}$ and $f_{VCOV}$ of the non-synchronous carriers of the two polarizations. The signals HI' and HQ' of the multiplier 77 are fed through A/D converters 78 and 79 to the respective second inputs of the correlators 73, 74, 75 and 76 as illustrated in FIG. 6. The correlators supply the setting values for the multipliers elements a, b, c and d in the transversal filter illustrated in FIG. 2. This is indicated by the designation "control" beside the corresponding arrows in FIGS. 2 and 6. The multiplication can also take place following the A/D converters.

Figure 8A:
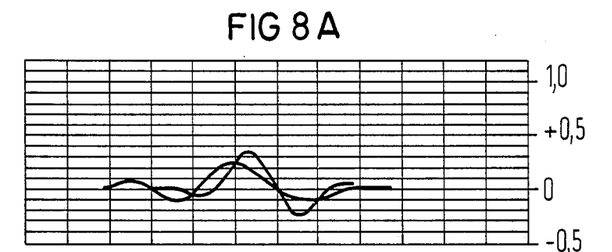
FIGS. 8A and 8B are diagrams of the interference signal, the compensation signal and the residual interference.
Figure 8B:
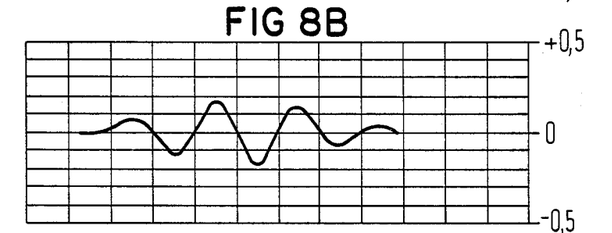
Figure 9A:
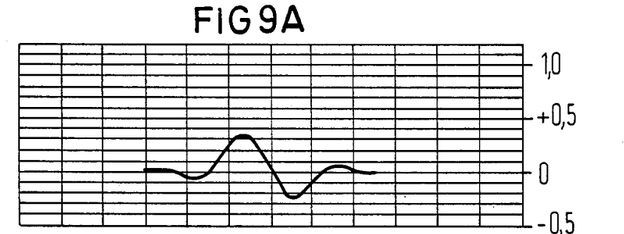
FIGS. 9A and 9B are diagrams of the interference signal, compensation signal and the residual interference using a Baud-space transversal filter or T/2 transversal filter (zero forcing algorithm).
Figure 9B:
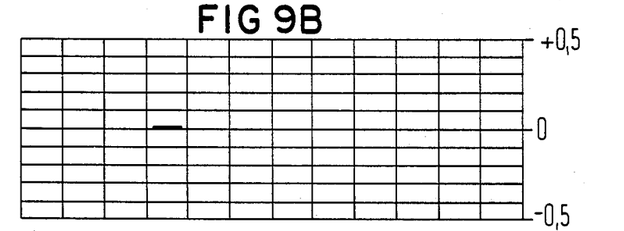

As previously mentioned, FIGS. 8A and 8B represent diagrams of the interference signal, the compensation signal and the residual interference for a simple base-band model with selective depolarization interference for a canceller comprising a 7Tap-Baud-spaced transversal filter. By contrast, in FIGS. 9A and 9B, are corresponding diagrams for the arrangement according to the invention comprising a canceller whose transversal filters have a delay time between the tappings of, for example, half a symbol period (T/2). In this manner, the sampling theorem is fulfilled and as illustrated in FIGS. 9A and 9B, the identity between the interference signal and the compensation signals is at all times fundamentally better than in the situation illustrated in FIGS. 8A and 8B. The residual interference is substantially better in the case of the canceller according to the invention which is also set according to the zero forcing algorithm.

Although the invention has been described with respect to preferred embodiments, it is not to be so limited as changes and modifications can be made which are within the full intended scope of the invention as defined by the appended claims.

I claim as my invention:

1. An adaptive depolarization-interference-compensator for digital radio relay systems using multi-level quadrature amplitude modulation (QAM) with channel operation of orthogonally polarized signals, which are not necessarily synchronous with the clock frequency and/or carrier frequency which use transversal filters and devices to output-couple signals from the receiving arm of the one polarization and to input-couple signals into the receiving path of the other polarization, comprising quadrature demodulators mounted in the receiving branches of the two receivers, which use the same local oscillator or separate local oscillators, and synchronized to each other for the differently polarized signals, and said quadrature demodulators produce the two signal components (I- and Q-channel), a canceller consists of two additional quadrature demodulators for the two polarization directions, each of which is supplied at its input with an IF-received signal of one polarization and with the IF-carrier of the other polarization, and consisting of a complex transversal filter (I- and Q-channel) in the signal paths to the two quadrature demodulators, and the transversal filters have their outputs coupled into the receiving arm of the respective other polarization and the delay time $\tau_0$ between tappings of the transversal filter corresponds at the maximum to one half the reciprocal value of the frequency of the highest spectral component of the base-band signal and where the rational ratio m/n preferably supplies a delay time which is shorter than or equal to $\tau_0$ and the m/n—ratio of the symbol period of the interference signal to the delay time between the tappings of the transversal filter; m, n are whole numbers.

2. An adaptive compensator according to claim 1, wherein to obtain the coefficients for setting the transversal filters of the cancellers, an error signal derived from the sampling of the disturbed received signal with a frequency which corresponds to the reciprocal value of the delay time of a delay element in the transversal filter of the canceller and which has a rational ratio m/n where m and n are whole numbers; and m>n to the clock rate of the interference signal, and a main signal which represents the interfering transmitted sequence and which is derived from the received signal of the other polarization, are supplied by way of delay elements, which have time delays equal to the time delays in the transversal filter to a chain of correlators in a time staggered manner and said correlators comprise multipliers and integrators in which the signal path of the error signal or of the multiplication result contains a switch-over device which switches the error sample values or multiplication results, which differ during the time n symbol period of the interference signal (=m period of the sampling clock rate of the error signal), to the corresponding integrators which have output signals which furnish the coefficient settings.

3. An adaptive compensator as claimed in claim 2 wherein for the acquisition of the main signal, a complex multiplication of the components of the received signal of the other polarization by the complex phasor of the difference of the carrier frequencies of the non-synchronous carriers of the two polarizations is accomplished and such multiplication is performed either preceding or following the A/D-converters in analogue or digital manner.

4. An adaptive compensator as claimed in claim 2, wherein for the acquisition of the main signal, the QAM-signal is quadrature-demodulated with the carrier of the respective other polarization.

5. An adaptive compensator as claimed in claim 2 or claim 3 or claim 4 wherein for the main signal and the error signal amplitude-quantized sample values are used, preferably a one-bit-quantization, and the multipliers required in the correlators consist of an EXOR-component (exclusive-OR-gate, mod 2 multiplication).

6. An adaptive compensator as claimed in claim 5, wherein for the acquisition of the error signal, two thresholds are used which correspond to the largest positive or negative values of the base-band signal, and an error signal sample value above the positive threshold supplies a positive contribution to the correlation, and an error signal sample value below the negative threshold supplies a negative contribution to the correlation and an error signal sample value between the two thresholds makes no contribution to the correlation.

* * * * *